United States Patent [19]
Hammond et al.

[11] Patent Number: 5,731,079
[45] Date of Patent: Mar. 24, 1998

[54] DIAMOND CUTTING TOOLS

[75] Inventors: Mark S. Hammond, Houston, Tex.; Joseph D. Evans, Lafayette, Colo.

[73] Assignee: SI Diamond Technology, Inc., Austin, Tex.

[21] Appl. No.: 594,705

[22] Filed: Jan. 31, 1996

Related U.S. Application Data

[62] Division of Ser. No. 438,772, May 11, 1995, Pat. No. 5,681,653.

[51] Int. Cl.⁶ ..................................................... B23P 15/02
[52] U.S. Cl. ........................... 428/336; 51/307; 51/309; 428/216; 428/408; 428/698; 428/704
[58] Field of Search ................................ 428/216, 698, 428/704, 336, 408; 51/307, 309

[56] References Cited

U.S. PATENT DOCUMENTS

| | | |
|---|---|---|
| 2,411,867 | 12/1946 | Brenner. |
| 3,464,804 | 9/1969 | Kuratomi et al.. |
| 3,645,706 | 2/1972 | Bovenkerk et al.. |
| 3,650,714 | 3/1972 | Farkas. |
| 3,859,057 | 1/1975 | Stoll et al.. |
| 3,879,901 | 4/1975 | Caveney. |
| 3,929,432 | 12/1975 | Daveney. |
| 4,011,064 | 3/1977 | Lee et al.. |
| 4,095,961 | 6/1978 | Wirth. |
| 4,399,167 | 8/1983 | Pipkin. |
| 4,554,201 | 11/1985 | Andreev et al.. |
| 4,776,863 | 10/1988 | van den Berg et al.. |
| 4,835,062 | 5/1989 | Holleck. |
| 5,103,701 | 4/1992 | Lundin et al.. |
| 5,127,924 | 7/1992 | Russell. |
| 5,133,332 | 7/1992 | Tanaka et al.. |
| 5,139,537 | 8/1992 | Julien. |
| 5,308,367 | 5/1994 | Julien. |
| 5,316,416 | 5/1994 | Kim. |
| 5,366,522 | 11/1994 | Nakamura et al.. |
| 5,392,759 | 2/1995 | Kwang. |
| 5,395,680 | 3/1995 | Santhanam et al.. |

OTHER PUBLICATIONS

A. Bakon and A. Szymanski, *Practical Uses of Diamond*, pp. 100-102. Brochure of Accurate Diamond Tool Corp. 62 Madison St., Hackensack, N.J.

*Primary Examiner*—Archene Turner
*Attorney, Agent, or Firm*—Winstead, Sechrest & Minick P.C.

[57] ABSTRACT

Single hard particles or single point cutting tools having the particles bonded thereto are coated with a modulated or layered composition of transition metal compounds or with titanium compounds to decrease mechanical failure of the particles. Titanium and zirconium nitrides may be used to form the modulated composition. Total thickness of the coatings is in the range from about 0.5 micrometer to about 30 micrometers. Individual layers of varying composition have a thickness in the range from about 0.5 nanometers to about 30 nanometers.

15 Claims, 2 Drawing Sheets

DIAMOND CUTTING TOOLS

This is a division of application Ser. No. 08/438,772 filed May 11, 1995, now U.S. Pat. No. 5,681,653.

FIELD OF THE INVENTION

This invention relates to cutting tools. More particularly, single crystal diamond and other hard materials having a coating of modulated or layered composition of two or more transition metal compounds is provided.

BACKGROUND OF THE INVENTION

Single particles of diamond, cubic boron nitride or coalesced polycrystalline compacts of diamond or cubic boron nitride may be fixed to a single point by a metal, such as by brazing, to provide a tool having a cutting action. A common use for such tools is in dressing of certain types of grinding wheels or cutting of highly abrasive alloys and metals. Generally, high-quality diamonds are selected for use in dressing tools for non-ferrous alloys. There are many different forms of such tools, both single-point and multi-point. Uses for such single or multi-point cutters include milling, turning, boring, cutting-off and slitting. In such tools, useful life of the cutter is determined by the rate of wear or the mechanical failure of the cutting particle or particles.

Single-point diamond dressers usually use shaped diamonds, mounted in a metal matrix; they are used to dress and impart or restore the required geometric shape to certain abrasive wheels. The amount of diamond wear before replacement is often limited so as to make it possible to re-shape the crystal for subsequent use. It is important in such use of diamonds to minimize failure of the particle by fracture or loss of substantial parts of the crystal or polycrystalline diamond compact.

U.S. Pat. No. 5,395,680 discloses a cutting tool having a substrate which is a composite of hard refractory grains and a coating of at least one layer deposited by chemical vapor deposition and an outer layer deposited by physical vapor deposition. The composite substrate is, for example, tungsten carbide bonded by a metallic binder material. The layer deposited by physical vapor deposition, such as titanium nitride, is said to have a residual compressive stress which increases the transverse rupture strength of the cutter.

Metal cladding of diamond particles has been practiced for a number of years, particularly with diamonds to be used in resin-bonded abrasive machining wheels. The advantages of such metal coatings on diamond particles are described, for example, in the book *Practical Uses of Diamond*, by Bakon and Szymanski, published by Ellis Horwood Limited, 1993, pages 100–102. U.S. Pat. Nos. 3,650,714 and 3,929,432 and 4,399,167 describe methods used for coating diamond particles with metal or metal alloy and use of the coated particles in the matrices of bonding materials to form various tools, wherein the metal coating improves the retention of the particles in a metal, ceramic or resin bonding material of the tool.

None of the references discloses a method or a material for decreasing mechanical failure of single particles of diamond or cubic boron nitride or polycrystalline diamond compacts in dressing or cutting operations, wherein the failure does not occur from lack of mechanical retention of the particle. There is great need for a method and materials to decrease mechanical failure of single crystals and polycrystalline compacts of diamond and cubic boron nitride when used in single point cutting tools.

SUMMARY OF THE INVENTION

We have discovered that the lifetime of cutting particles coated with a coating of modulated composition of two or more transition metal compounds when used in a dressing tool for grinding wheels is increased significantly over that of uncoated particles. The coating may have a thickness of about 0.5 micrometers to about 30 micrometers. It may be deposited by any method for varying the composition of transition metals during formation of the coating, but preferably is deposited by the method of co-pending application Ser. No. 08/390,542. Suitable metals are titanium and zirconium, and they may be deposited from a cathodic arc in a vacuum chamber having a controlled pressure of nitrogen gas so as to form metal nitrides. The composition of the metals varies in a sinusoidal fashion with distance through the thickness of the coating. In another embodiment, a coating of a titanium compound is deposited on such hard particles. The mechanical failure of cutting particles is significantly decreased or prevented by the coating.

DETAILED DESCRIPTION OF PREFERRED EMBODIMENT

Figure 1:
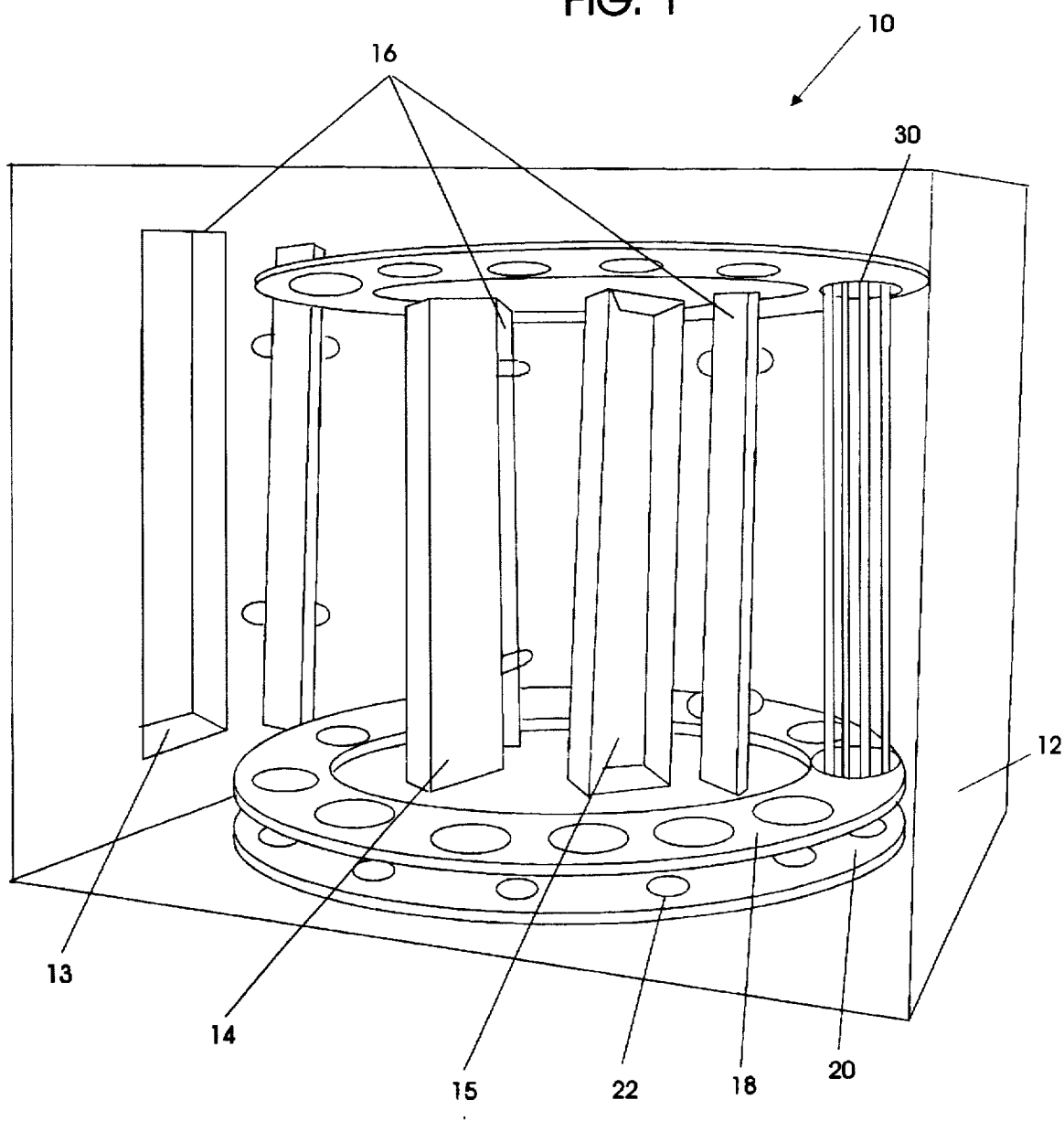
FIG. 1 is a sketch of apparatus suitable for forming the coated particle of this invention.

Referring to FIG. 1, a sketch of apparatus 10 suitable for forming the coated diamond particle of this invention is shown. Vacuum chamber 12 is evacuated by vacuum pumps (not shown). Access to chamber 12 may be though doors, upon which cathode assemblies such as 13 may be mounted. Cathode assembly 14 has the same metal cathode as does cathode assembly 13. Assemblies 13 and 14 are on opposite sides of the path of articles to be coated and are offset along the path of motion of the articles. A third cathode assembly 15 is directed approximately 180° from cathode assembly 14, and has a cathode of different transition metal than the metal of cathode assemblies 13 and 14. A fourth cathode assembly, having the same composition as the third cathode assembly, is not shown in FIG. 1, for greater clarity. Turntable 20 is mounted for rotation about its axis and is driven by power from below the vacuum chamber. Electrical insulators 22 isolate carriage 18 from turntable 20, so that electrical bias voltage can be applied to carriage 18, which is electrically conducting. Sample mounting supports 30, also electrically conducting, are supported by carriage 18. Articles of manufacture of the present invention are affixed to supports 30 by appropriate means. Supports 30 provide planetary motion of articles as they move through the region between cathodes, two of each transition metal. Details of the apparatus are fully explained in co-pending application Ser. No. 08/390,542.

Figure 2:
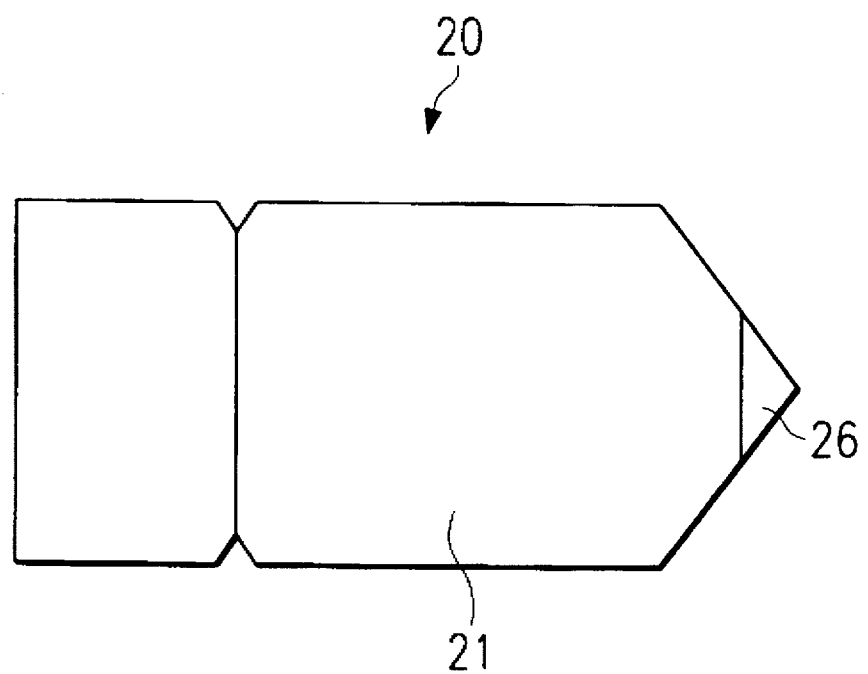
FIG. 2 is a sketch of an example single-point cutting tool having a diamond particle and metal bonding.

FIG. 2 shows single-point cutting tool 20, having tool holder 21 and single crystal diamond or polycrystalline diamond compact 26. Diamond 26 is usually held in place by metallic bonding material, such as by brazing. Tools such as shown in FIG. 2 are sold by a variety of companies, and are well-known in industry. Many different forms of single and multi-point dressing or cutting tools are sold. Each is characterized by one or more diamond, cubic boron nitride or compact particles which directly and independently contact a workpiece.

To form one embodiment of the present invention, a cutting tool such as tool 20 is coated with a thin coating having a modulated composition of two or more transition metal compounds. The coating may be deposited by physical vapor deposition over the entire tool, although it can have an effect only on the working surface of the tool, namely diamond or compact 26. The coating is preferably deposited using the apparatus and method of copending application Ser. 08/390,542, but, in another embodiment, the article of this invention has a coating deposited in a layered fashion, such as, for example, the method for depositing the coatings described in U.S. Pat. No. 4,835,062, wherein the objects to be coated are simply moved on a turntable beneath cathodes of different transition metals. U.S. Pat. No. 4,835,062 is hereby incorporated by reference herein for all purposes. The layers consist of transition metal compounds which are selected such that the layers are partially or completely coherent.

Single point dressing tools having a single diamond crystal as the working surface were coated with a modulated composition of titanium nitride and zirconium nitride. The tools were first cleaned, using procedures set out in the referenced co-pending patent application Ser. No. 08/390, 542. After pumpdown of vacuum chamber 12 (FIG. 1) to a pressure of about $1 \times 10^{-6}$ torr, radiant heaters (not shown in FIG. 1) were activated and the tools were moved in planetary motion through the chamber. Temperature was raised to about 300° C. An argon ion etch was then used to clean the tools by increasing argon pressure in chamber 12 to about $5 \times 10^{-3}$ torr and increasing voltage on the tools to about negative 600–1000 volts. Then the titanium arc was struck and the tools were bombarded with argon and titanium ions to form a titanium layer about 15 nm thick to increase adhesion of a film to the tool.

After the adhesion layer was formed, the argon gas flow was augmented with about 50 percent nitrogen. The pressure was set at about $3 \times 10^{-3}$ torr and bias voltage on the tools was set at about 600 volts. Current and rotational speed were set such that the individual layer thicknesses of titanium nitride and zirconium nitride were in the range of about 10 nm. Coating continued for 2.5 hours, until the total thickness of the coating of modulated composition was about 3000–4000 nm.

Tools coated as described above were tested for lifetime as a dressing tool for aluminum oxide grinding wheels. The grinding wheels were used in milling of crankshafts made of 8620 steel. Four uncoated tools were tested and found to dress 300, 290, 305 and 302 pieces before failure. Microscopic examination of the failed tools showed failure occurred because of splintering or fracturing of the diamond crystal. Two coated tools were tested under the same conditions and about 2,000 and 3,750 pieces were dressed before failure. The crystals no longer failed by massive fracturing, but by chipping. When the diamond failed by chipping, much more of the diamond crystal was left intact for re-shaping and possible re-use than was the case for the uncoated tools.

The explanation of the increased lifetime of tools of this invention is not completely clear. While not wishing to be bound by hypothesis, the improvement is probably related to high compressive stress imparted to the surface of the crystal by the coating. Another factor may be protection against surface chemical oxidation at the high temperatures of the cutting surface. It is not related to the diamond-metal bond in the tools tested, because the coating does not exist at that interface. The same mechanism effective for diamond crystals would be effective for cubic boron nitride and for polycrystalline compacts of diamond or cubic boron nitride or other very hard cutting materials which fail by massive fracturing of the cutting body, such as occurred with the diamond crystals.

We have shown that high compressive stress imparted to the surface of a high hardness cutting material will decrease the failure of cutting material particles by massive fracturing. It is known that high compressive stress can be imparted by titanium nitride coatings, as well as by the coatings of modulated composition described herein. Therefore, coatings of titanium nitride or of modulated composition of mixtures of transition metals can be used to improve single point cutting tools having diamond, cubic boron nitride or polycrystalline compacts of either material as the working surface. The method of forming such particles or cutting tools may be such as described herein for modulated composition coatings except only one electrode or one electrode material, i.e., titanium, is used as a cathode in the vacuum chamber. Other Group IVA or Group VA transition metals or alloys thereof may be substituted for titanium.

Although no tests have been performed in which the hard cutting material is coated before attachment to a support or bonding material, the same benefit of reducing failure by mechanical failure of particles, seen in these tests, can be realized by coating individual particles before they are incorporated into a tool, whether a cutting tool, dressing tool or grinding tool. When diamond is used, the diamond may be synthetic or natural.

The particle size of the single point cutting material is not important, as long as failure of the tool is controlled to a substantial degree by mechanical failure of individual particles. The coating will not be effectual if failure of a tool is substantially caused by loss of hard particles from a bonding material or matrix even when the particle has not failed mechanically. Since mechanical failure of particles may lead to loss of particles from a bonding material, it will be necessary to determine lifetime of grinding wheels with coated and uncoated particles to determine the effects of coating of individual particles.

To coat individual particles to produce the particles of this invention, apparatus of FIG. 1 will preferably be modified such that single layers of particles are loosely supported between electrically conducting screens and the screens are rotated in planetary motion as described in the referenced patent application. Preferably, the screens or other structures supporting the particles on each side of a vertical plane are additionally moved with respect to each other so as to rotate the individual particles within the vertical plane and expose the entire surface of the particles to the transition metal compounds formed from the metal of the arcs. Once a layer of a conducting material, such as the initial titanium layer, is formed on the particles, they become effectively electrically conducting.

The invention has been described with reference to its preferred embodiments. Those of ordinary skill in the art may, upon reading this disclosure, appreciate changes or modifications which do not depart from the scope and spirit of the invention as described above or claimed hereafter.

What is claimed is:

1. A cutting tool, comprising:
    a single particle;
    a support for the particle; and
    a coating on the surface of the particle comprising a sinusoidally modulated composition of compounds of two or more transition metals.

2. The cutting tool of claim 1 wherein the compounds are formed from titanium and zirconium reacted with a gas selected from the group of gases consisting of nitrogen, acetylene and borane.

3. The cutting tool of claim 1 wherein the coating is formed from reactive plasma cathodic arcs of the transition metals in a vacuum chamber.

4. The coating of claim 1 wherein the coating is formed before the particle is affixed to the tool holder and covers the entire particle.

5. The cutting tool of claim 1 wherein the thickness of the coating is in the range from about 0.5 micrometers to about 30 micrometers.

6. The cutting tool of claim 1 wherein the distance along the thickness of the coating between similar concentrations of a transition metal is from about 1 nanometer to about 30 nanometers.

7. The cutting tool of claim 1 wherein the particle is comprised of a diamond crystal.

8. The cutting tool of claim 1 wherein the particle is comprised of cubic boron nitride.

9. The cutting tool of claim 1 wherein the particle is comprised of a polycrystalline compact of either diamond of cubic boron nitride.

10. A cutting tool, comprising:
a single particle;
a support for the particle; and
a coating on the surface of the particle comprising titanium nitride.

11. The cutting tool of claim 10 wherein the coating is formed before the particle is affixed to the tool holder so as to cover substantially the entire particle.

12. The cutting tool of claim 10 wherein the thickness of the coating is in the range from about 0.5 micrometers to about 30 micrometers.

13. The cutting tool of claim 10 wherein the particle is comprised of a diamond crystal.

14. The cutting tool of claim 10 wherein the particle is comprised of cubic boron nitride.

15. The cutting tool of claim 10 wherein the particle is comprised of a polycrystalline compact of either diamond or cubic boron nitride.

* * * * *